(12) United States Patent
Jeong et al.

(10) Patent No.: US 11,724,397 B2
(45) Date of Patent: Aug. 15, 2023

(54) ROBOT AND METHOD FOR CONTROLLING THE SAME

(71) Applicant: LG ELECTRONICS INC., Seoul (KR)

(72) Inventors: Jimann Jeong, Seoul (KR); Jihwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 524 days.

(21) Appl. No.: 16/904,302

(22) Filed: Jun. 17, 2020

(65) Prior Publication Data

US 2021/0114215 A1 Apr. 22, 2021

(30) Foreign Application Priority Data

Oct. 16, 2019 (KR) .......................... 10-2019-0128507

(51) Int. Cl.
*B25J 9/16* (2006.01)
*B25J 19/02* (2006.01)
*B25J 13/08* (2006.01)
*B25J 13/00* (2006.01)

(52) U.S. Cl.
CPC ............ *B25J 9/1666* (2013.01); *B25J 9/161* (2013.01); *B25J 9/1697* (2013.01); *B25J 13/003* (2013.01); *B25J 13/088* (2013.01); *B25J 19/026* (2013.01)

(58) Field of Classification Search
CPC ........ B25J 9/1666; B25J 9/161; B25J 9/1697; B25J 13/003; B25J 13/088; B25J 19/026; B25J 9/1676; B25J 19/023; B25J 9/1674; B25J 9/1653; G05B 2219/39082;

(Continued)

(56) References Cited

U.S. PATENT DOCUMENTS

| 8,229,129 B2 * | 7/2012 | Jeong | ..................... H04R 3/005 381/94.1 |
| 2016/0059418 A1 * | 3/2016 | Nakamura | ........... G05D 1/0274 901/1 |
| 2018/0353042 A1 * | 12/2018 | Gil | ......................... A47L 9/2826 |

FOREIGN PATENT DOCUMENTS

| CN | 203804981 U | * | 9/2014 |
| JP | 6330200 | | 4/2015 |
| JP | 2015081831 A | * | 4/2015 |

(Continued)

OTHER PUBLICATIONS

English Translation for JP2017102755A (Year: 2017).*

(Continued)

*Primary Examiner* — Rachid Bendidi
(74) *Attorney, Agent, or Firm* — Lee, Hong, Degerman, Kang & Waimey PC

(57) ABSTRACT

A robot and operation method is disclosed. The robot according to the present disclosure may include a sensor, a microphone, and a controller. The robot may execute an artificial intelligence (AI) algorithm and/or a machine learning algorithm, and may communicate with other electronic devices in a 5G communication environment. An embodiment may include detecting a movement of the robot to a location; detecting an obstacle within a predetermined range from the robot; estimating an occupation area of the obstacle in space; and identifying a sound signal received from the estimated occupation area of the obstacle from among a plurality of sound signals received by a plurality of microphones of the robot at the location.

15 Claims, 13 Drawing Sheets

(58) Field of Classification Search
CPC ........... G05B 2219/49143; G05B 2219/49157; G05B 19/4061
See application file for complete search history.

(56) References Cited

FOREIGN PATENT DOCUMENTS

| | | | |
|---|---|---|---|
| JP | 6221158 | | 4/2016 |
| JP | 2017102755 A | * | 6/2017 |
| KR | 1020070050283 | | 5/2007 |
| KR | 101456866 | | 10/2014 |
| KR | 1020180079824 | | 7/2018 |
| KR | 1020180134230 | | 12/2018 |
| KR | 1020190108711 | | 9/2019 |

OTHER PUBLICATIONS

English Translation for JP2015081831 (Year: 2015).*
English Translation for CN203804981 (Year: 2014).*
Korean Intellectual Property Office Application Serial No. 10-2019-0128507, Office Action dated Feb. 24, 2021, 5 pages.

\* cited by examiner

ROBOT AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0128507, filed on Oct. 16, 2019, the contents of which are all hereby incorporated by reference herein in its entirety.

BACKGROUND

1. Technical Field

The present disclosure relates to a robot for receiving sound signals through a plurality of microphones and a method for controlling the same.

2. Description of Related Art

A robot is a device capable of automatically handling tasks through its own capabilities. In recent years, fields utilizing robots have been further expanded, and accordingly, robots such as medical robots, guidance robots, and aerospace robots have been developed. In addition, home robots applicable to regular households are also being actively developed.

In general, a service robot in the related art is connected to a server through a network to transmit speech data to the server, and estimates a direction of a sound source by using a plurality of speech recognition microphones and then transmits the estimated direction information on the sound source to the server.

However, when an obstacle is around the service robot, the service robot is unable to address the problem due to distortion of sound signals inputted to the microphones.

In addition, a home robot in the related art receives speech signals through a plurality of microphones, and estimates a location of a sound source from which the received speech signals originate.

However, in the related art, a specific implementation method for achieving this is not clearly described, and the home robot is unable to overcome issues of receiving distorted sound signals due to an obstacle around the home robot.

SUMMARY OF THE INVENTION

The present disclosure is directed to providing a robot for detecting a sound signal that is distorted due to reflection from an obstacle and then inputted to a plurality of microphones, when sound signals are received through the plurality of microphones. The present disclosure is also directed to providing a method for controlling the robot.

The present disclosure is further directed to providing a robot for minimizing the influence of a sound signal that is reflected from an obstacle and then inputted to a plurality of microphones, when sound signals are received through the plurality of microphones. The present disclosure is also directed to providing a method for controlling the robot.

The present disclosure is still further directed to providing a robot for estimating a direction of a sound source. The present disclosure is also directed to providing a method for controlling the robot.

The present disclosure is not limited to what has been described above, and other aspects not mentioned herein will be apparent from the following description to one of ordinary skill in the art to which the present disclosure pertains.

A method for controlling a robot according to one embodiment of the present disclosure may include detecting a movement of the robot to a location; detecting an obstacle within a predetermined range from the robot; estimating an occupation area of the obstacle in space; and identifying a sound signal received from the estimated occupation area of the obstacle from among a plurality of sound signals received by a plurality of microphones of the robot at the location.

A robot according to another embodiment of the present disclosure may include: a vision recognition-based camera configured to capture a surroundings of the robot; an inertial measurement sensor (IMS) configured to detect movement of the robot; a plurality of microphones arranged in a predetermined area of the robot; and a controller.

In response to a predetermined movement of the robot being detected through the inertial measurement sensor (IMS), the controller may be configured to find an obstacle within a predetermined range from the robot by using the camera.

In addition, the controller may be configured to, in response to the obstacle being found, estimate an occupation area of the obstacle in space; and identify a sound signal received from the estimated occupation area of the obstacle from among a plurality of sound signals received by the plurality of microphones at the location.

According to various embodiments of the present disclosure, the following effects may be derived.

First, when sound signals are received through a plurality of microphones, since a sound signal distorted by an obstacle may be detected and properly processed, it is possible to minimize the influence of the sound signal distorted by the obstacle.

Second, since a direction of a sound source that generates a sound may be estimated, it is possible to improve direction detection and beamforming performance of a robot.

DETAILED DESCRIPTION

Figure 1:
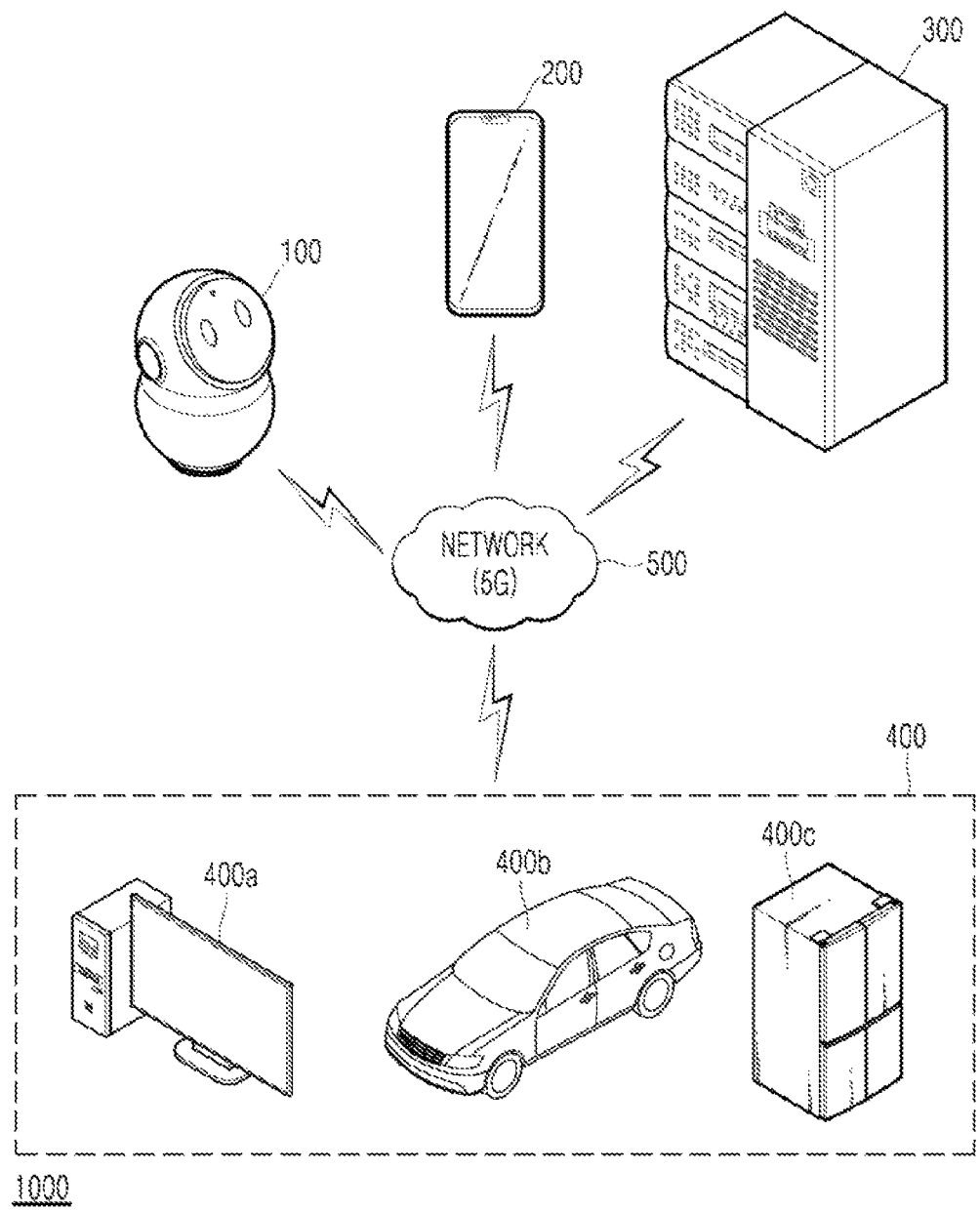
FIG. 1 is a view illustrating a 5G network-based cloud system, according to one embodiment of the present disclosure.

Since various embodiments of the present disclosure may use techniques related to artificial intelligence, artificial intelligence will be schematically described below.

Artificial intelligence (AI) refers to a field of studying devices with capability to perceive or obtain new information and decide an output or action, or a methodology for creating the same. Moreover, machine learning refers to a subset of AI, and refers to field of computer algorithms that improve automatically through experience and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons of different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyper-parameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

Machine learning may be classified into supervised learning, unsupervised learning, and reinforcement learning depending on the learning method.

Supervised learning may refer to a method for training an artificial neural network with training data that has already been labeled. In addition, the label may refer to a target answer (or a result value) to be determined by the artificial neural network when the training data is inputted to the artificial neural network. Unsupervised learning may refer to a method for training an artificial neural network using training data that has not already been labeled. Reinforcement learning may refer to a learning method for training an agent defined in an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

Hereinafter, exemplary embodiments disclosed herein will be described in detail with reference to the accompanying drawings, and like reference numerals designate like elements, and redundant description thereof will be omitted. Wherever possible, the same reference numbers will be used throughout the drawings to refer to the same or like parts. In the following description, well-known functions or structures to those of ordinary skill in the art are not explained.

FIG. 1 is a view illustrating an example of a 5G network-based cloud system 1000, according to one embodiment of the present disclosure.

Referring to FIG. 1, the cloud system 1000 may include a robot 100, a mobile terminal 200, an information providing system 300, various devices 400, and a 5G network 500.

The robot 100 may be mobile or stationary. When the robot 100 is mobile, the robot 100 may drive mounted wheels so as to move to a destination set by the robot 100 or an inputted destination. When the robot 100 is stationary, the robot 100 may move in compliance with an external force.

When disposed at a predetermined indoor or outdoor location, the robot 100 may receive sound signals from its surroundings through a microphone array composed of a plurality of microphones, and may interact with users, animals, electronic devices, and/or robots located in its vicinity or surroundings. In an alternative embodiment, the robot 100 may be located in a home.

The mobile terminal 200 may communicate with the robot 100 through a communication network such as the 5G network 500, and transmit a control command to the robot 100. The mobile terminal 200 may display or otherwise provide image-based information. In addition, the mobile terminal 100 may include mobile devices, such as a mobile phone, a smartphone, and the like, or and a wearable device such as a smart watch, smart glasses, and a head mounted display (HMD), and the like.

The information providing system 300 may receive requests, process information, provide various pieces of information to the robot 100, and respond to various requests from the robot 100. In an embodiment, the information providing system 300 may perform complex operations (for example, deep learning operations) requested by the robot 100. To this end, the information providing system 300 may store various information used to perform the operations in a memory (320 of FIG. 6 described below). In some embodiments, the information providing system 300 may be implemented as a server computing terminal connected to communication networks such as the 5G network 500, for communicating information with other computing devices, such as mobile terminal 200, various devices 400, and robot 100.

The various devices 400 may include, for example, a personal computer (PC) 400a, an autonomous vehicle 400b, and a refrigerator 400c. The various devices 400 may be connected to, for example, the robot 100, the mobile terminal 200, and the information providing system 300 through a communication network such as the 5G network 500.

In an embodiment, the robot 100, the mobile terminal 200, the information providing system 300, and the various devices 400 may all be capable of communication on the 5G wireless standard. For example, the robot 100, the mobile terminal 200, the information providing system 300, and each of the various devices 400 may have 5G wireless standard communication enabled hardware installed therein to transmit and receive data according to the 5G wireless standard, for example at a rate of 100 Mbps to 20 Gbps (or higher). Accordingly, each component of the cloud system 1000 may transmit large amounts of information to other components, and may be operated at lower power to minimize power consumption compared to other wireless communication protocols. However, it will be understood by those of ordinary skill in the art that the present disclosure of the network 500 is not limited to the 5G wireless standard, and that the network protocols and transmission rate may be implemented differently according to various embodiments.

The 5G network 500 may provide a communication environment of devices in a wired or wireless manner including, for example, a 5G mobile communication network, a local area network, and the Internet.

Figure 2:
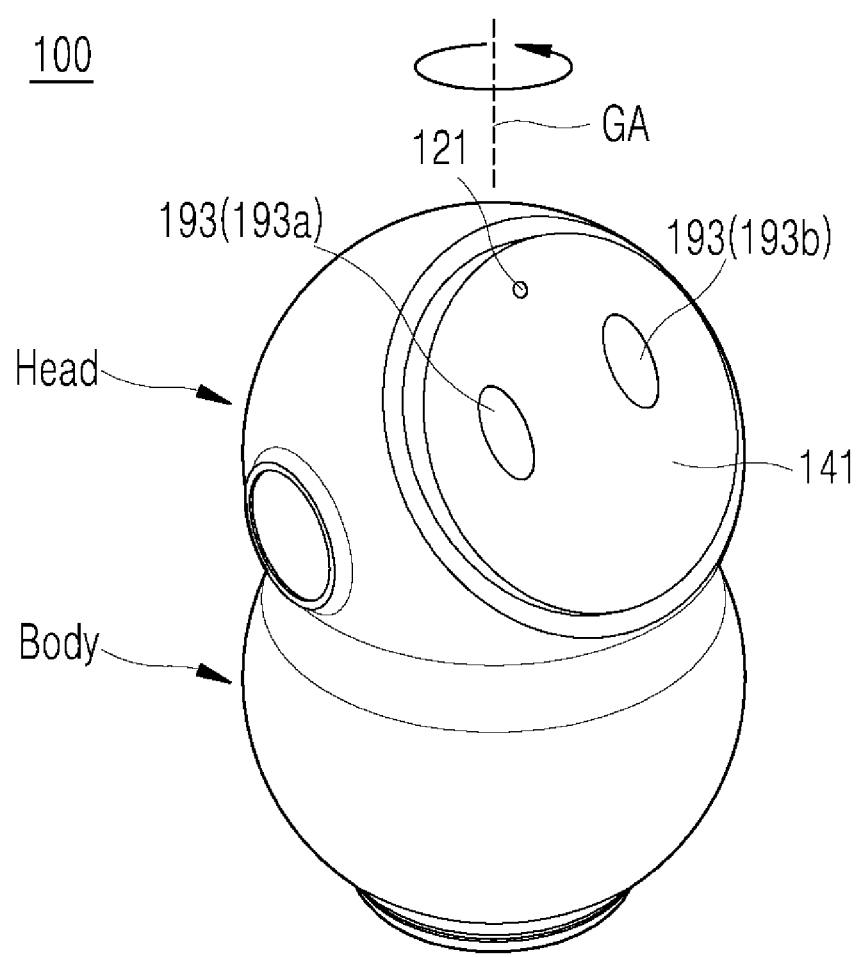
FIG. 2 is a view illustrating an external appearance of a robot, according to one embodiment of the present disclosure.

FIG. 2 is a view illustrating an external appearance of the robot 100, according to one embodiment of the present disclosure.

The robot 100 is a device capable of communicating with various external devices, and may be disposed in a predetermined space (for example, a home, a hospital, a shopping center, or a corporate office space). For the purposes of this disclosure, it is assumed that the robot 100 is disposed in a home, however it will be understood that this is not limiting, and that operation and placement of the robot 100 in various locations and spaces, indoors and outdoors, is contemplated by this disclosure.

Regarding the configuration of the robot 100, the robot 100 may include a head (Head) and body (Body). The Head may form an upper part of the robot 100, and the Body may be coupled to the Head to form a lower part of the robot 100.

First, the Head may include a display 141 to display various contents or to provide an interface for interacting with the robot 100, such as a video call. In one example, the display 141 may display elliptical or circular items 193 (193a, 193b) similar to the shape of eyes, and may perform interactions such as winks and blinks. Accordingly, the robot 100 may present a friendly manner to the user.

A camera 121 may be disposed at the Head, and in one embodiment the camera may be located within an area of the display 141, and may be used to capture images, where a user may be recognized by the robot via images captured by the camera 121. while not depicted, a plurality of cameras 121 may also be implemented as necessary. In an embodiment, the camera 121 may include a depth capturing module, or may be implemented as a stereo camera.

The Body may have various modules and circuits, for example, for driving the robot 100, and may include a rotation driver (170 of FIG. 6 described below) to cause robot 100 to rotate about a gravity axis GA of the robot 100. In addition, the Body may cause the Head to tilt in the left/right direction or in the front/rear direction. In an alternative embodiment, some or all of rotation driver 170 may be disposed in the Head.

According to an embodiment, the robot 100 may include one or more wheels disposed at the point where the Body contacts the ground. In this case, the robot 100 may further include a driver such as a motor for driving the wheels.

The robot 100 may capture images of its surroundings using the camera 121 while rotating about a gravity axis GA of the robot 100. The camera 121 may have a vision recognition function to recognize an object based on the captured image.

According to one embodiment, the camera 121 may include a distance sensor capable of automatically detecting a distance, thereby measuring a distance to an object in a capturing direction of the camera 121.

Figure 3:
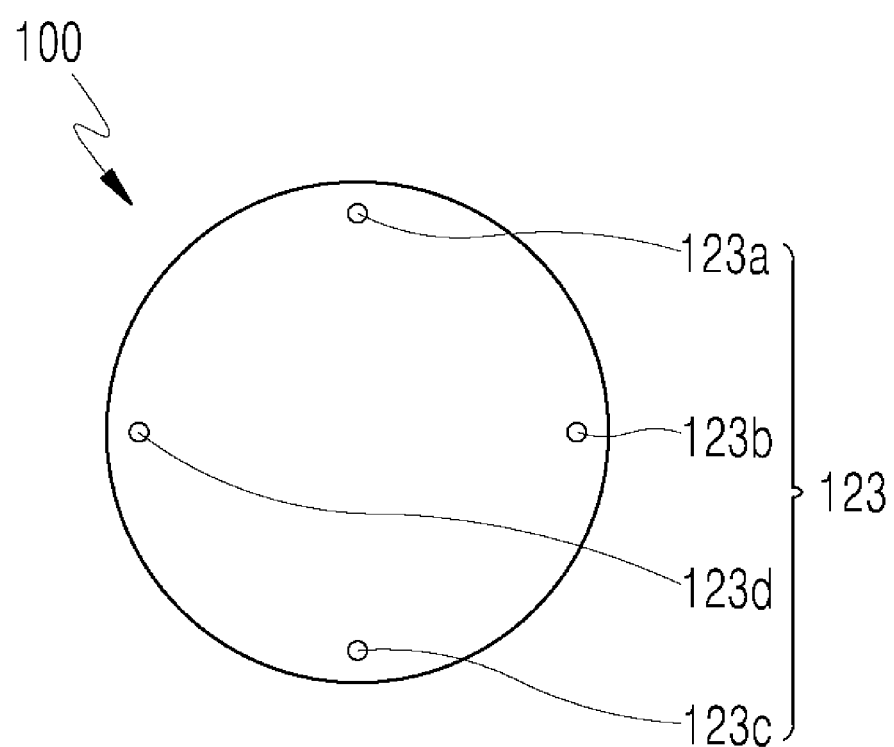
FIG. 3 is a top view of a plurality of microphones arranged in a predetermined area of a robot, according to one embodiment of the present disclosure.

FIG. 3 is a top view showing an arrangement of a plurality of microphones 123 on the robot 100, according to one embodiment of the disclosure. It will be understood that FIG. 3 is depicting only the arrangement positions of the microphones 123, and that other elements of robot 100, such as the display 141 and camera 121 are omitted from the view. It will further be understood that the plurality of microphones may be vertically arranged along various points on the Head or Body, thus FIG. 3 is not intended to show that the plurality of microphones are visible from the top view.

In one embodiment, the plurality of microphones 123 (123a to 123d) may be uniformly arranged to be spaced apart by a predetermined distance from one another in a predetermined area of the Head.

In one embodiment, two microphones 123b, 123c of the plurality of microphones 123 (123a to 123d) may be arranged toward the front of the Head, while another two microphones 123a, 123d may be arranged toward the back of the Head, assuming that the lower right direction shown in FIG. 3 is a front direction of the robot 100. That is, two pairs of microphones may each be arranged toward the front and the rear of the robot 100, respectively. In this case, the arrangement of the plurality of microphones 123 (123a to 123d) may be form a shape such as square, rectangle, or rhombus. However, according to various embodiments, the number of microphones may vary, and the location of each microphone and shapes formed by their arrangement may also vary.

The robot 100 may recognize, using the plurality of microphones 123 (123a to 123d), a direction from which sound originates. By using time difference-based correlations between sound signals received through the plurality of microphones 123 (123a to 123d), the robot 100 may recognize a direction from which the sound signals originate.

However, when a sound signal is reflected off of an obstacle and the reflected sound waves are then received at the plurality of microphones 123 (123a to 123d), it may be difficult for the robot 100 to locate the direction from which the sound originates. For this reason, the accuracy of recognizing the sound is also lowered. As such, the robot 100 according to various embodiments of the present disclosure may detect distortions of sound signals resulting from reflections or deflections caused by obstacles, and may reduce the influence of the distorted sound signal, thereby more accurately locating the sound source and recognizing sounds.

For example, when an obstacle, such as a wall, is in the vicinity of the robot 100, it may be difficult for the robot 100 to accurately measure the direction of the sound signals received at the robot 100, due to the distorted sound signal reflected from the wall. For this reason, the accuracy of recognizing the sound based on the received sound signals may be lowered. For example, the robot 100 may have difficulties recognizing whether the sound is generated by a dog, a person, an electronic device, or some other object.

Figure 4:
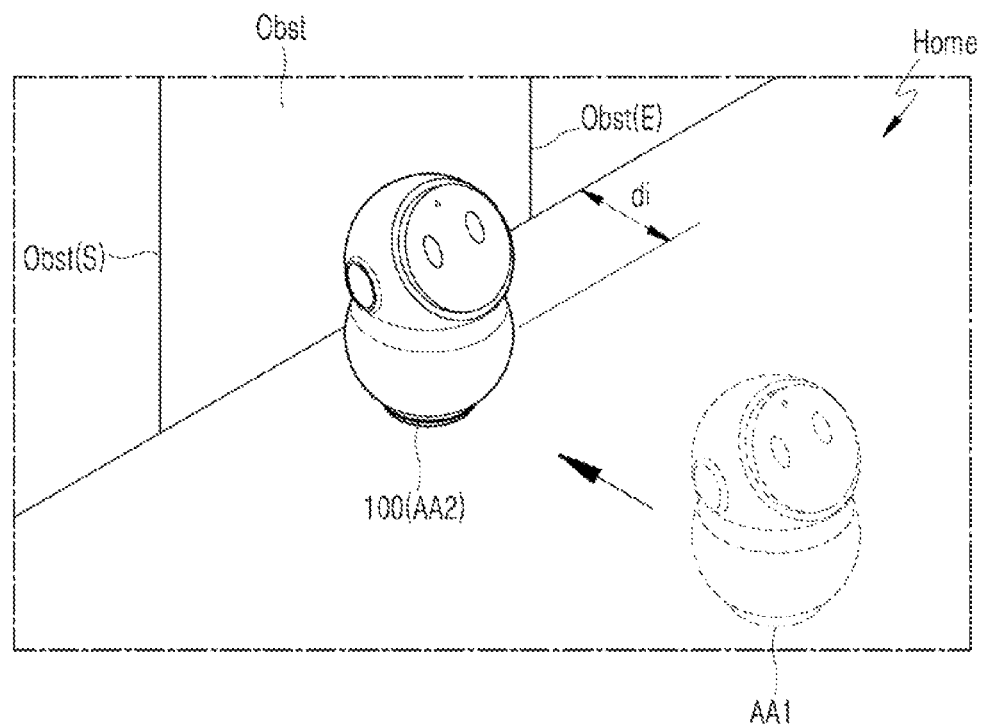
FIG. 4 is a view illustrating a situation in which a robot is driven to move to a location spaced apart by a predetermined distance from an obstacle, according to one embodiment of the present disclosure.

FIG. 4 is a view illustrating a situation in which a robot is driven to move to a location spaced apart by a predetermined distance from the obstacle, according to one embodiment of the present disclosure. Here, the obstacle Obst is assumed to be a wall. The start surface Obst(S) and the end surface Obst(E) of the space occupied by the obstacle Obst are defined as shown.

The robot 100 may move from a first location AA1 to a second location AA2 in the home. The movement may be manually performed by a user, or may be automatically performed by a movement module of the robot 100. The robot 100 may detect the movement or motion of the robot 100 using an inertial measurement sensor (IMS) (131 of FIG. 6).

The robot 100 may be disposed to be spaced apart by a predetermined distance "di" from the obstacle Obst. In one example, the predetermined distance di may be set to be 30 cm, but embodiments of the present disclosure are not limited thereto.

When the robot 100 is located at the first location AA1, the robot 100 may receive sound signals through the plurality of microphones. However, when the robot 100 is located at the second location AA2, the robot 100 may process the received sound signals to remove or minimize the influence of sound signals reflected from the obstacle Obst, or distorted sound signals, where the sound signals received at the robot 100 may have an echo effect due to the distance from the obstacle Obst.

When the movement by a predetermined distance of the robot 100 or a predetermined motion of the robot 100 is detected by the inertial measurement sensor IMS, the robot 100 may perform an auto calibration. The auto calibration is a calibration related to the location of the robot 100, and may include driving to find the obstacle in the vicinity of the new location where the robot has moved.

In the present disclosure, the obstacle Obst is assumed to be the wall, but may refer to, for example, a person, a structure, or other object. The robot 100 may determine the degree of processing of the received sound signals based on reflectance information and dimension information on the obstacle Obst.

The reflectance information may represent the degree to which the obstacle Obst reflects the sound signal. The dimension information may be information on the dimension, such as size, width, area, and volume of the obstacle Obst, and may include, for example, information representing a mathematical space area (for example, a straight line being one-dimensional information, a plane being two-dimensional information, and a geometric space being three-dimensional information).

Figure 5:
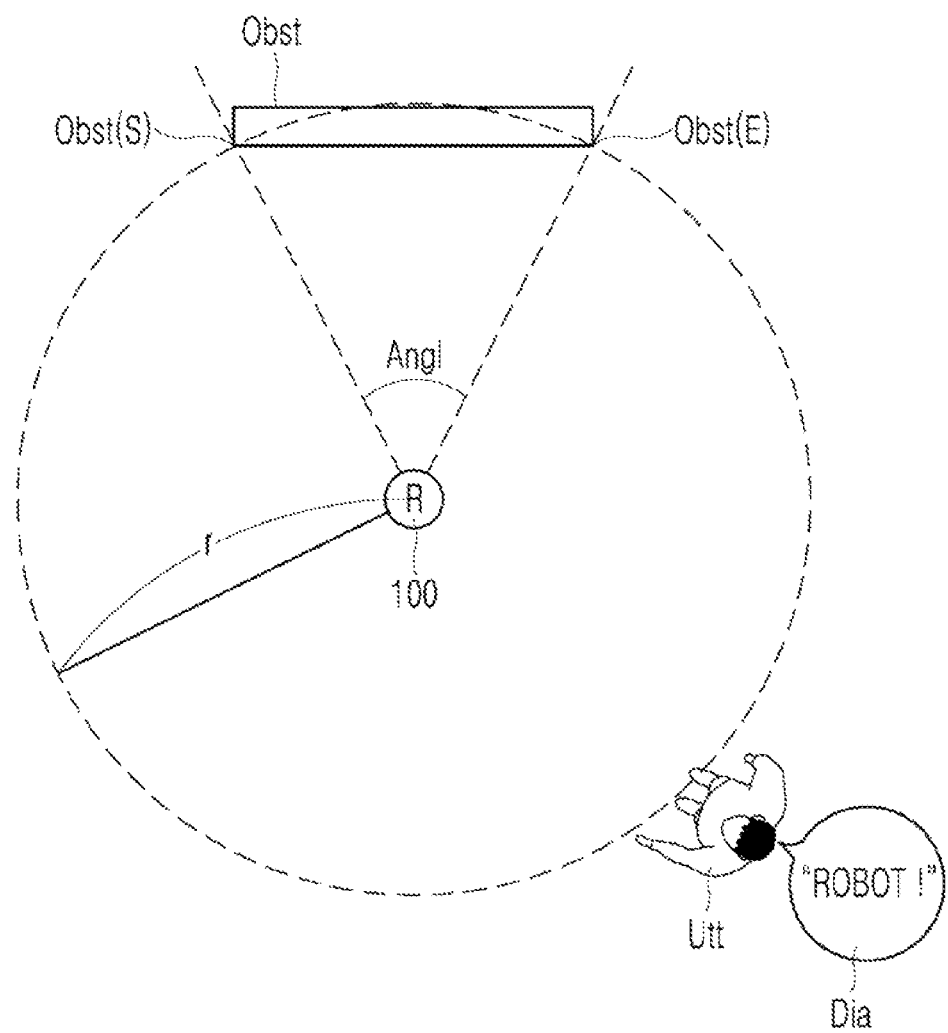
FIG. 5 is a view illustrating a situation in which a robot is driven to find an obstacle around the robot while rotating, according to one embodiment of the present disclosure.

FIG. 5 is a view illustrating the robot finding the obstacle while rotating, according to one embodiment of the present disclosure.

The robot 100 may find the obstacle Obst spaced apart by a predetermined distance r from the robot 100 while rotating, and may measure an angle Angl corresponding to the space occupied by the obstacle Obst with respect to the position of the robot, otherwise referred to herein as an "occupancy angle". The robot 100 may measure the occupancy angle Angl based on the start surface Obst(S) (or the start point) and the end surface Obst(E) (or the end point) of the obstacle Obst detected by the robot in the space.

In addition, the robot 100 may estimate the area occupied by the obstacle Obst, otherwise referred to as an "occupancy area," in the space using various methods. A detailed description of the method of estimating the occupancy area of the obstacle Obst will be described further below.

In one example, for an utterance sound "ROBOT!", shown as Dia, spoken by a speaker, shown as Utt, when the sound signals are directly inputted to the plurality of microphones, the robot 100 may immediately store the sound signals. However, when sound signals are reflected from the obstacle Obst and then indirectly received at the plurality of microphones, the robot 100 may process the reflected sound signal. That is, the robot 100 may attenuate or ignore the sound signals reflected from the obstacle Obst, or minimize the influence of the reflected sound signals.

Figure 6:
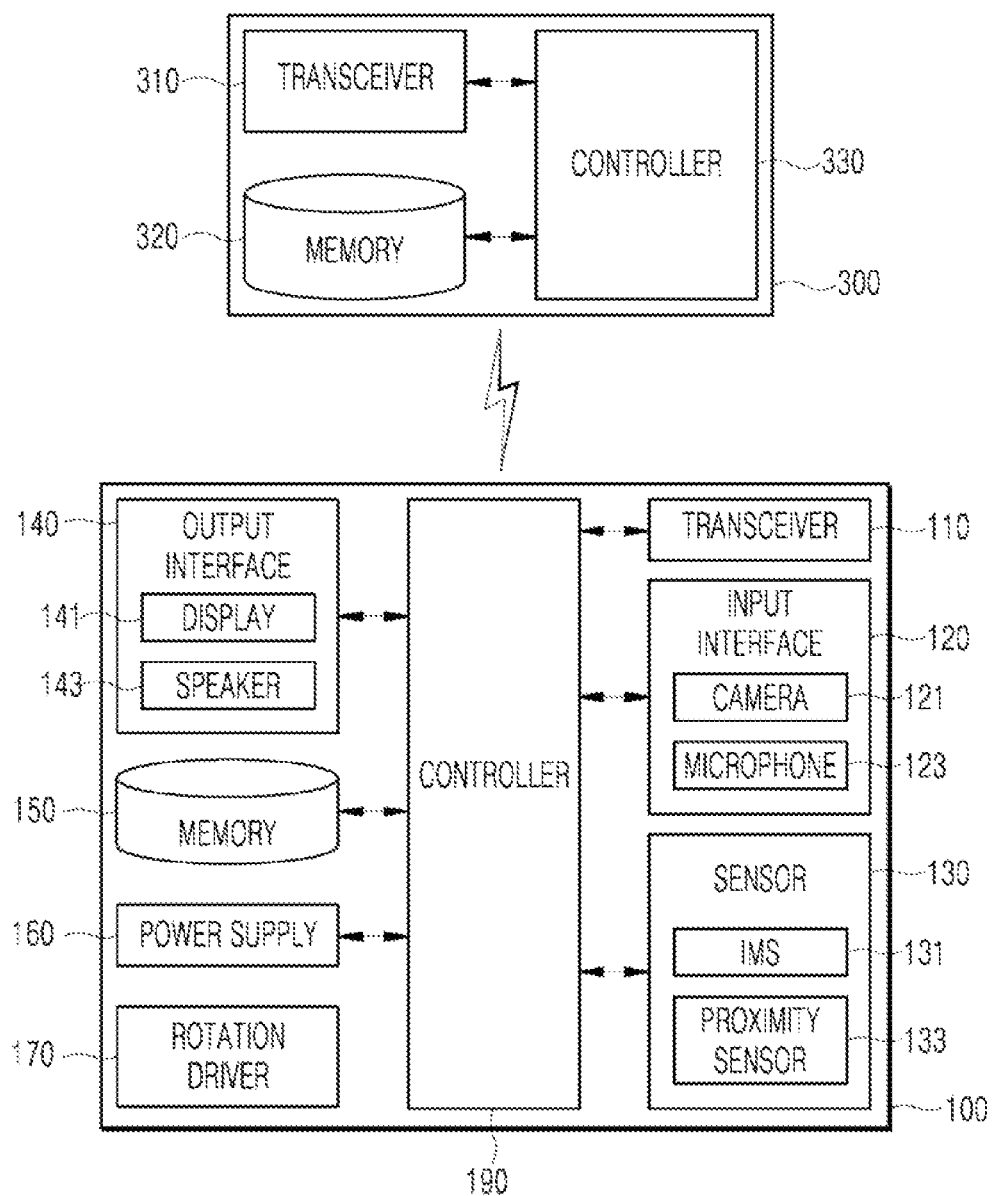
FIG. 6 is a relative block diagram illustrating a configuration of a robot capable of communicating with an information providing system, according to one embodiment of the present disclosure.

FIG. 6 is a block diagram illustrating a configuration of the robot 100 capable of communicating with the information providing system 300, according to one embodiment of the present disclosure.

The robot 100 may include a transceiver 110, an input interface 120, a sensor 130, an output interface 140, a memory 150, a power supply 160, a rotation driver 170, and a controller 190. It will be understood by those of ordinary skill that the robot 100 according to various embodiments may have more or fewer components than those listed above.

The transceiver 110 may include a wired or wireless communication module capable of communicating with the information providing system 300.

In an alternative embodiment, the transceiver 110 may have a hardware module, such as a modem or other transceiving circuitry, related to Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, and Near Field Communication (NFC) communication.

In an embodiment, the controller 190, through the transceiver 110, may transmit information and request the information providing system 300 to perform artificial intelligence operations.

The input interface 120 may include a user interface or a user input interface configured to receive information from a user. In one embodiment, the input interface 120 may include physical buttons, keys, other input mechanism, or a touchscreen implemented with display 141. In an embodiment, the input interface 120 may include a camera 121 from which the input interface 120 receives an image signal and a microphone 123 from which the input interface 120 receives an audio signal. The camera 121 or microphone 123 may be considered as a sensor, and a signal obtained by the camera 121 or microphone 123 may be referred to as sensing data or sensor information.

The camera 121 may capture images of the surroundings of the robot 100, and may have a vision recognition function. A plurality of cameras 123 may also be implemented as necessary, and may be arranged in predetermined areas of the robot 100.

The input interface 120 may obtain, for example, images to be used as training data for model training and input data to be used to obtain an output by using a trained model. The input interface 120 may obtain raw input data. In this case, the controller 190 may extract an input feature by preprocessing the input data.

The sensor 130 may obtain, using various sensors, at least one of internal information on the robot 100, surrounding environment information on the robot 100, or user information.

The sensor 130 may include, for example, hardware based sensors such as a satellite-based location receiving sensor, a distance detection sensor, a connector connection detection sensor, an illumination sensor, an acceleration sensor, a magnetic sensor, a gyro sensor, an inertial sensor, an RGB sensor, an infrared (IR) sensor, a finger scan sensor, an ultrasonic sensor, an optical sensor, a microphone, a light detection and ranging (LiDAR) sensor, a barometer sensor, or a radar sensor, and the like.

The sensor 130 may include an inertial measurement sensor (IMS) 131. The inertial measurement sensor (IMS) 131 may include, for example, the gyro sensor, the acceleration sensor, and/or the electromagnetic sensor to detect, for example, rotation, movement, and specific motion of the robot 100.

In addition, the sensor 131 may include a proximity sensor 133 to detect an obstacle in the vicinity of the robot 100 and estimate dimension information on the detected obstacle. The proximity sensor 133 may recognize the start and end points of the obstacle to estimate dimension information on the obstacle.

The output interface 140 may generate a visual, auditory, or haptic related output. In addition, the output interface 140 may include, for example, hardware based outputs such as an optical output interface, that is the display 141, for outputting visual information, and a speaker 143 for outputting auditory information. The speaker 143 may output audible frequency sound information and high-frequency sound information. The output interface 140 may include a haptic module for outputting haptic information.

The memory 150 may store data for supporting various functions of the robot 100. The memory 150 may include physical hardware memory units such as ROM and RAM units which may store a plurality of application programs (or applications) running on the robot 100, data needed to operate the robot 100, and commands for the robot 100.

In addition, the memory 150 may store information used to perform operations using artificial intelligence, machine learning, and artificial neural network. The memory 150 may store a deep neural network model. The deep neural network model may be used to infer a result value with respect to new input data other than learning data, and the inferred result value may be used as a basis for determining which action to perform.

The controller 190 may store a plurality of deep neural network models in the memory 150, or may cause the information providing system 300 to store the plurality of deep neural network models through requests and information transmitted to the transceiver 110. In an embodiment, the controller 190 may store a first deep neural network model in the memory 150, wherein the first deep neural network model may output information on the obstacle based on the inputted captured image, or in addition to other sensed information. In addition, the controller 190 may store a second deep neural network model in the memory 150, wherein the second deep neural network model may receive, as input data, sound information received at the robot 100 and direction information on the sound signals received at the robot 100, and then output direction information on the sound source of the sound signals.

Upon a specific captured image being captured, the controller 190 may store, in the memory 150, a label for recognizing the obstacle based on the specific captured image. Meanwhile, when the sound information outputted from the sound source and the direction information on the sound signals are received at the robot 100, the controller 190 may store, in the memory 150, a label presenting the direction information on the sound source. As a result, a deep neural network model may be generated, and the result of supervised learning may be derived more accurately.

Under the control of the controller 190, the power supply 160 may be supplied with external power or internal power, and supply power to each component included in the robot 100. The power supply 160 may include a battery, which may be an internal battery or a replaceable battery. The battery may be charged via a wired or wireless charging scheme, wherein the wireless charging scheme may include a magnetic induction scheme or a magnetic resonance scheme.

The rotation driver 170 is a module, such as a motor, for causing the robot 100 to rotate about a gravity axis of the robot 100. Accordingly, the robot 100 may rotate about its gravity axis, however in an alternative embodiment, the robot 100 may also rotate about another central axis of the robot 100.

The controller 190 may include one or more processors, and may be a module for controlling the components of the robot 100. Here, the controller 190 may refer to, for example, a hardware-embedded data processing device having a circuit that is physically structured to execute functions represented as instructions or codes included in a program. Examples of the hardware-embedded data processing device may include a processing device, such as a microprocessor, a central processing unit CPU, a processor core, a multi-processor, an application-specific integrated circuit ASIC, and a field programmable gate array (FPGA). However, the scope of the present disclosure is not limited thereto. In some embodiments, the robot 100 may include a dedicated AI controller, or processor, not depicted, for performing AI related tasks. The controllers may work in conjunction with each other to maximize processing efficiency and reduce power consumption. Thus, the robot 100 may be implemented with one or more controllers, or processors.

Hereinafter, driving of the controller 190 will mainly be described.

The controller 190 may detect the movement of the robot 100. The controller 190 may detect the movement of the robot 100 using, for example, various sensors and cameras 121. In an alternative embodiment, the controller 190 may detect the movement of the robot 100 through the inertial measurement sensor 131.

The controller 190 may detect a predetermined movement of the robot 100. The controller 190 may determine that the predetermined movement of the robot 100 has occurred only when the robot 100 is in close proximity to the obstacle. When the robot 100 moves by a predetermined distance or reaches a location spaced apart by a predetermined distance from the obstacle, the controller 190 may determine that the predetermined movement of the robot 100 has occurred.

In this case, the controller 190 may use the proximity sensor 133 or the camera 121 to detect the robot 100 reaching a location spaced apart from the obstacle by the predetermined distance. For example, when the robot 100 reaches the location spaced apart by several tens of centimeters from the obstacle, it may be determined that the robot 100 is close to the obstacle, but embodiments are not limited thereto. As a result, since complex operations according to the predetermined movement are performed only when the robot 100 is in close proximity to the obstacle, it is possible to improve the efficiency of the robot 100.

However, in an alternative embodiment, when the robot 100 only moves by a predetermined distance, the controller 190 may determine that the predetermined movement is detected, when a slew motion, such as rotation, of the robot 100 occurs.

The controller 190 may find the obstacle within a predetermined range from the robot 100 by using the camera 121. Here, the predetermined range may include a distance range in which the sound signals received by the plurality of microphones 123 are distorted or a in which sound is absorbed by the specific obstacle by a predetermined level. However, when the obstacle is a wall and the robot 100 is within a predetermined distance, such as 30 cm, from the wall, the controller 190 may determine or it may be preset that the problem (sound distortion or sound absorption) is likely to occur.

In an embodiment, when the robot 100 captures images of its surroundings using the vision recognition-based camera while rotating about the gravity axis of the robot 100, the controller 190 may recognize the obstacle based on captured image information.

The controller 190 may recognize the obstacle based on a first deep neural network model, wherein the first deep neural network model may receive the captured image information as input data, recognize the obstacle based on the captured image information, and output recognized obstacle information as output data.

In response to the obstacle being found and identified, the controller 190 may estimate the occupancy area of the obstacle in the space.

The controller 190 may also obtain, based on the captured image information, the dimension information of the obstacle in the space where the robot is located.

As described above, the dimension information may be information on the dimensions, such as size, width, area, and volume, of the obstacle Obst, and may include, for example, information representing a mathematical space area (for example, a straight line being one-dimensional information, a plane being two-dimensional information, and a geometric space being three-dimensional information).

The controller 190 may estimate the occupancy area of the obstacle in the space based the dimension information. That is, the controller 190 may estimate the occupancy area of the obstacle in three-dimensional space.

In another embodiment, while the robot 100 rotates about its gravity axis, the controller 190 may detect the obstacle through the proximity sensor 133. In addition, while the robot 100 rotates about its gravity axis, the controller 190 may estimate occupancy area of the obstacle using the proximity sensor 133.

Based on the controller 190 estimating the occupancy area of the obstacle using the camera 121, the controller 190 may detect the sound signals received by the plurality of microphones 123 from the estimated occupancy area of the obstacle.

Accordingly, when processing the sound signals from a direction corresponding to a detected obstacle, the robot 100 may process sound signals to remove or reduce the influence of the sound signals from the direction corresponding to the obstacle. Thus, the robot may, in one example, improve detection of a direction of a sound source and perform beamforming in the direction of the sound source.

In an embodiment, the controller 190 may estimate the occupancy area of the obstacle by using the speaker 143 by outputting high-frequency sound information.

Thus, when the high-frequency sound signals are received through the plurality of microphones 123, the controller 190 may obtain, using an echo cancellation algorithm, one of the high-frequency sound signals that is reflected from the obstacle.

The high-frequency sound information may be inaudible sound information of 17 KHz or more, but a frequency range may vary according to various embodiments.

The controller 190 may also identify and disregard a sound signal that is outputted from the speaker 143 and is directly received by the plurality of microphones 123, and as a result, may identify only the high-frequency sound signals reflected from the obstacle.

The controller 190 may also obtain the dimension information on the obstacle based on the degree of change in steered response power (SRP) values determined at each of various angles from around the robot 100. The SRP is a detected power value of the sound signal received from the surroundings of the robot 100 at each predetermined angle (for example, 1 degree, or 5 degrees to 10 degrees, but embodiments are not limited thereto), and the degree of change in an SRP value is equal to the $SRP_{post}$ value minus the $SRP_{pre}$ value. The $SRP_{post}$ value may be the SRP value after applying the echo cancellation algorithm, and the $SRP_{pre}$ value may be the SRP value before reproducing the high-frequency sound information. In an alternative embodiment, the $SRP_{pre}$ value may be the SRP value before applying the echo cancellation algorithm.

The controller 190 may store a graph depicting the $SRP_{pre}$ values. The controller 190 may also measure the $SRP_{pre}$ value depending on ambient noise signals or sensor noises present in the plurality of microphones 123, before reproducing a high-frequency sound, and may store information on the $SRP_{pre}$ value in the memory 150.

When the degree of change in the SRP value exceeds a predetermined value, the controller 190 may obtain, as the dimension information on the obstacle, a point having the degree of change exceeding the predetermined value, and may estimate the occupancy area of the obstacle based on the obtained dimension information.

The controller 190 may collect the SRP value from around the robot 100 in response to the sound information being outputted from the predetermined sound source, and may lower one of the collected SRP values that corresponds to the sound signal received at the plurality of microphones 123 from the estimated occupancy area of the obstacle.

When the sound signal is reflected from the obstacle, the controller 190 may lower the SRP value, thereby preventing distortion of the sound signals due to the obstacle.

After adjusting the SRP value, the controller 190 may estimate that the sound source is disposed at an angle corresponding to a highest one of the SRP values.

In addition, when the sound information from the sound source is speech information, the controller 190 may amplify the sound signal from the sound source by performing beamforming in a direction of the sound source, and as a result, may improve recognition of the speech information based on the amplified sound signal. Accordingly, it is possible to increase the accuracy of identifying the sound information.

When estimating direction information on the sound source, the controller 190 may perform an artificial intelligence operation, which will be described below.

Referring back to FIG. 6, the information providing system 300 in communication with the robot 100 may include a transceiver 310, a memory 320, and a controller 330. The differences between the configurations of the information providing system 300 and the robot 100 100 will be mainly described.

The controller 330 of the information providing system 300 may perform operations requested by the robot 100 which are received via the transceiver 110. When the robot 100 requests information stored in an external server, the controller 330 may provide the information to the robot 100, and may perform the artificial intelligence operation as necessary to provide the information to the robot 100.

In the following, a method for operation of the robot 100 will be described with reference to FIGS. 7 to 13, according to various embodiments of the present disclosure.

Figure 7:
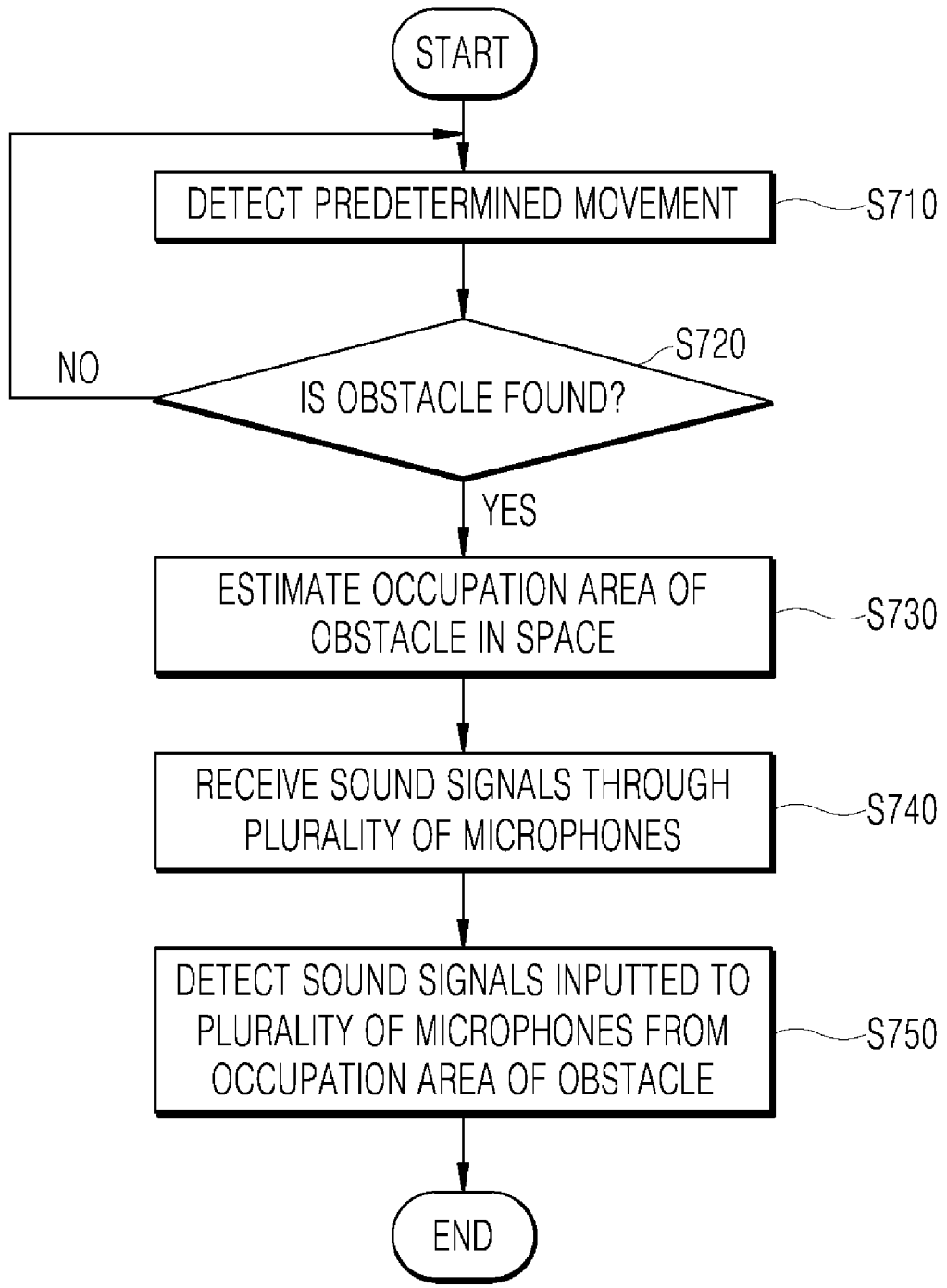
FIGS. 7 to 13 are sequence diagrams illustrating a method for driving a robot, according to various embodiments of the present disclosure.

FIG. 7 is a sequence diagram illustrating a method for operation of the robot 100, according to one embodiment of the present disclosure.

Referring FIG. 7, when a predetermined movement of the robot 100 is detected S710, the robot 100 may find the obstacle within a predetermined range from the robot 100 S720.

When the obstacle is found S720, the robot 100 may estimate the occupation area of the obstacle in space S730.

Subsequently, the robot 100 may receive sound signals through the plurality of microphones S740.

Lastly, the robot 100 may identify or detect a sound signal inputted to, or in other words received at, the plurality of microphones 123 from the estimated occupancy area of the obstacle S750.

Figure 8:
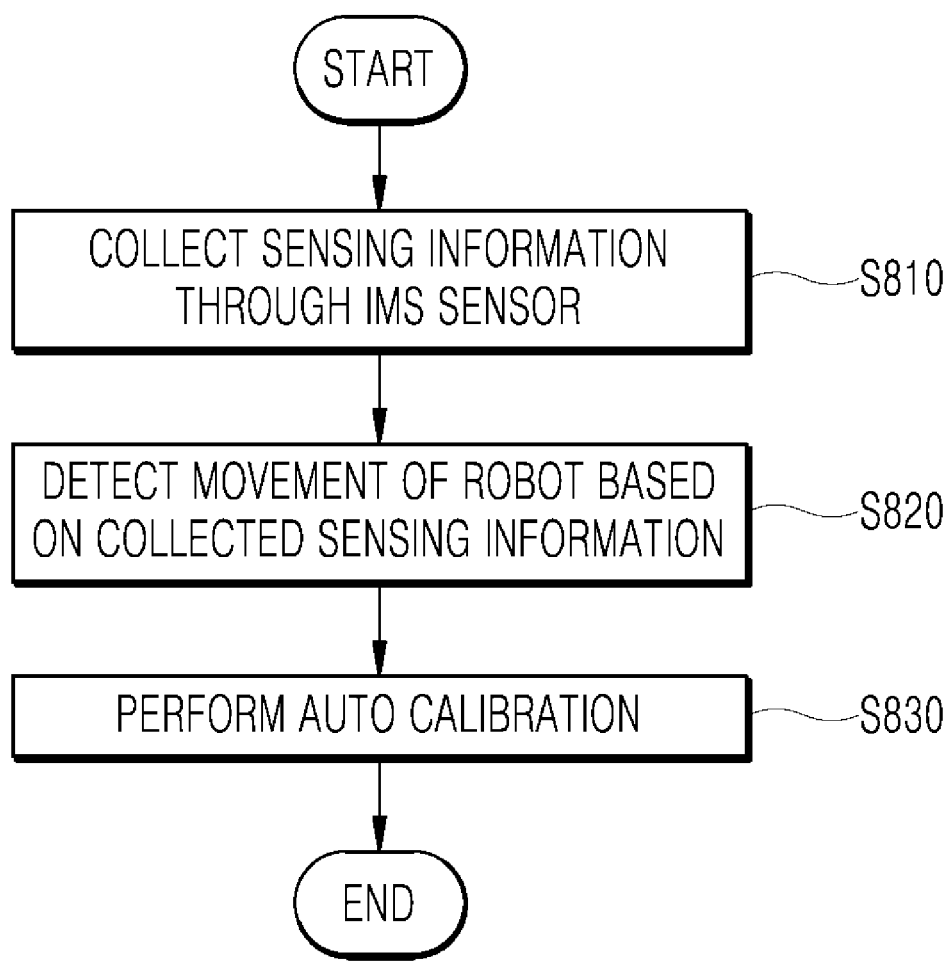

FIG. 8 is a sequence diagram illustrating steps performed before finding the obstacle S720 of FIG. 7.

The robot 100 may collect sensing information through the IMS sensor 131 S810.

As described above, the IMS sensor 131 may detect a specific movement and motion of the robot 100.

The robot 100 may detect the movement of the robot based on collected sensing information S820.

The robot 100 may determine the movement of the robot 100 based on the degree of change in a sensing value of the IMS sensor 131.

Upon detection of the movement, the robot 100 may perform auto calibration S830.

The auto calibration is auto calibration with respect to a location, and may be referred to as an operation for finding the obstacle around the robot 100. The robot 100 may detect a predetermined movement of the robot 100 based on the sensing value of the IMS sensor 131.

Figure 9:
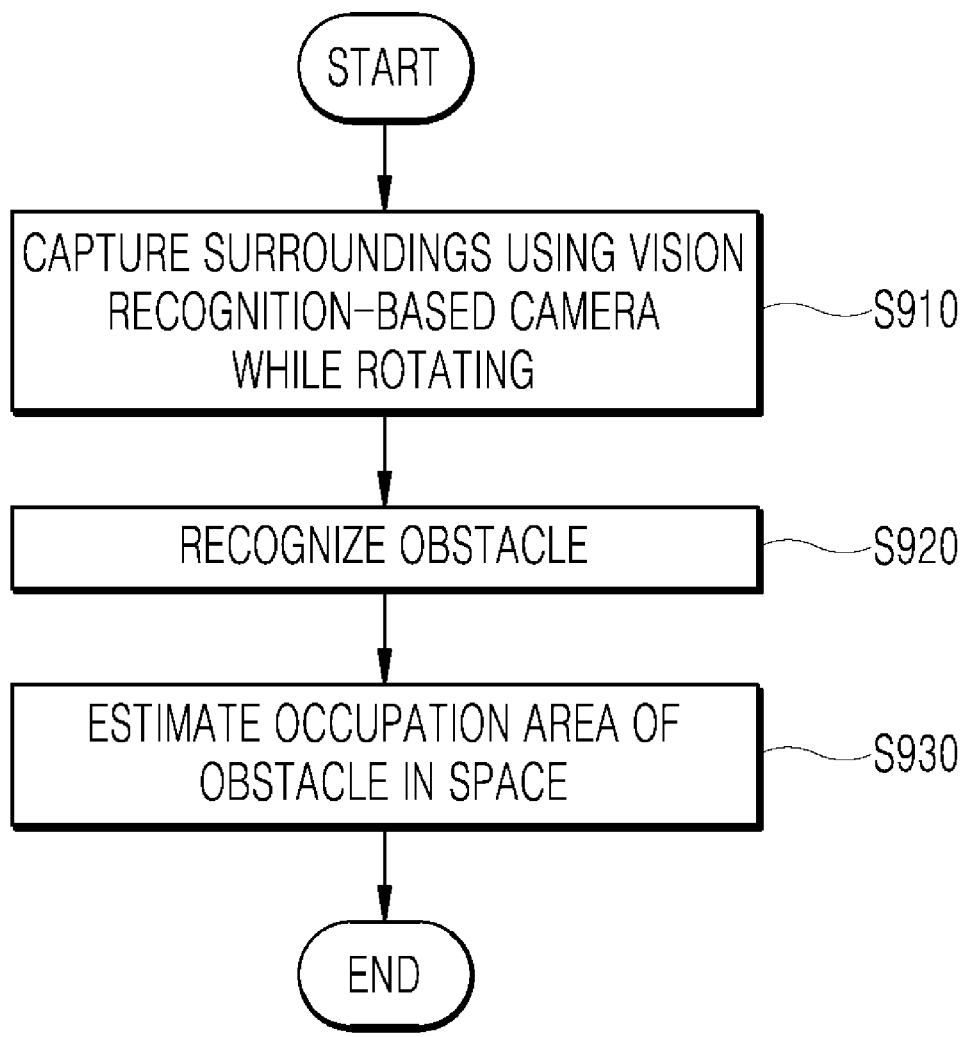
Figure 10:
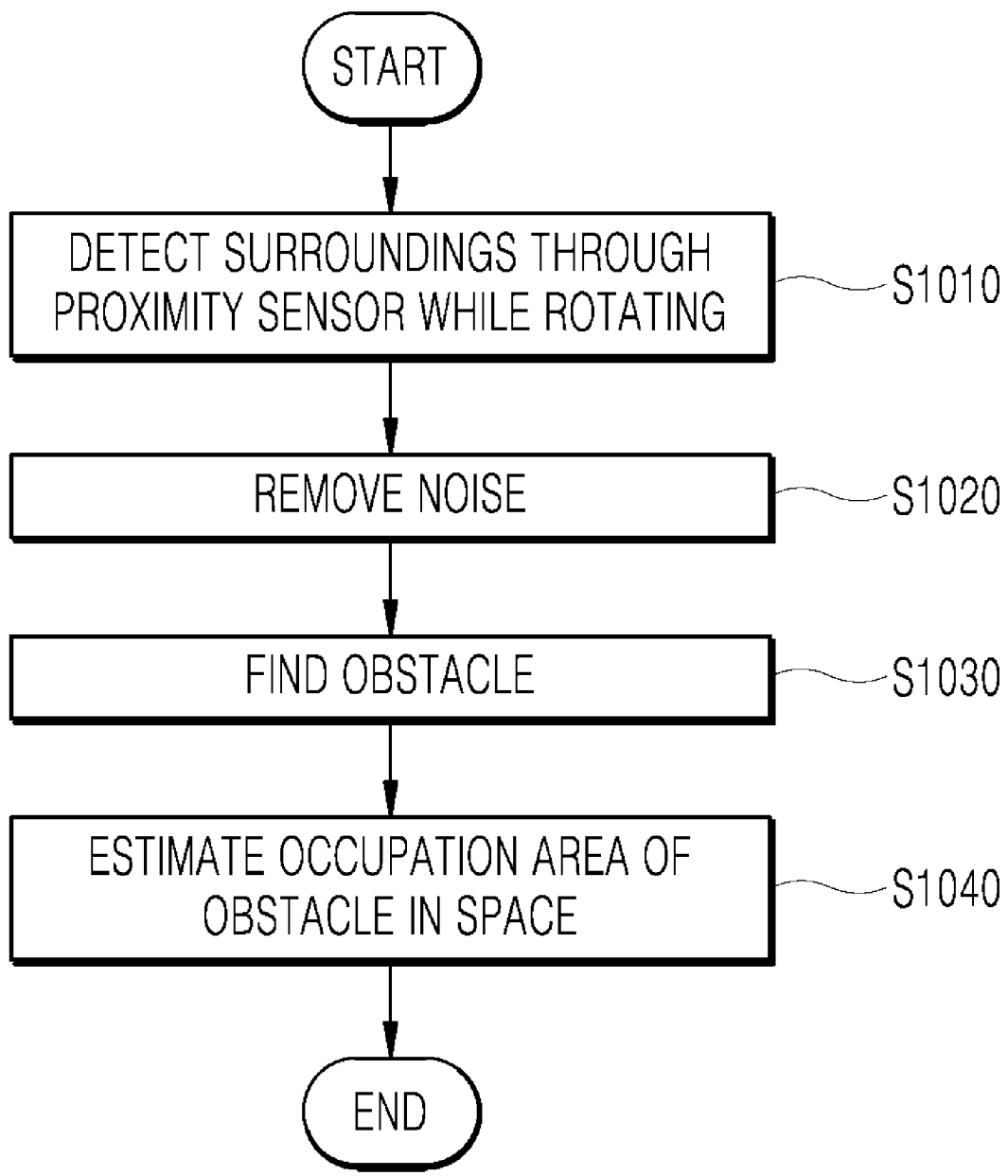
Figure 11:
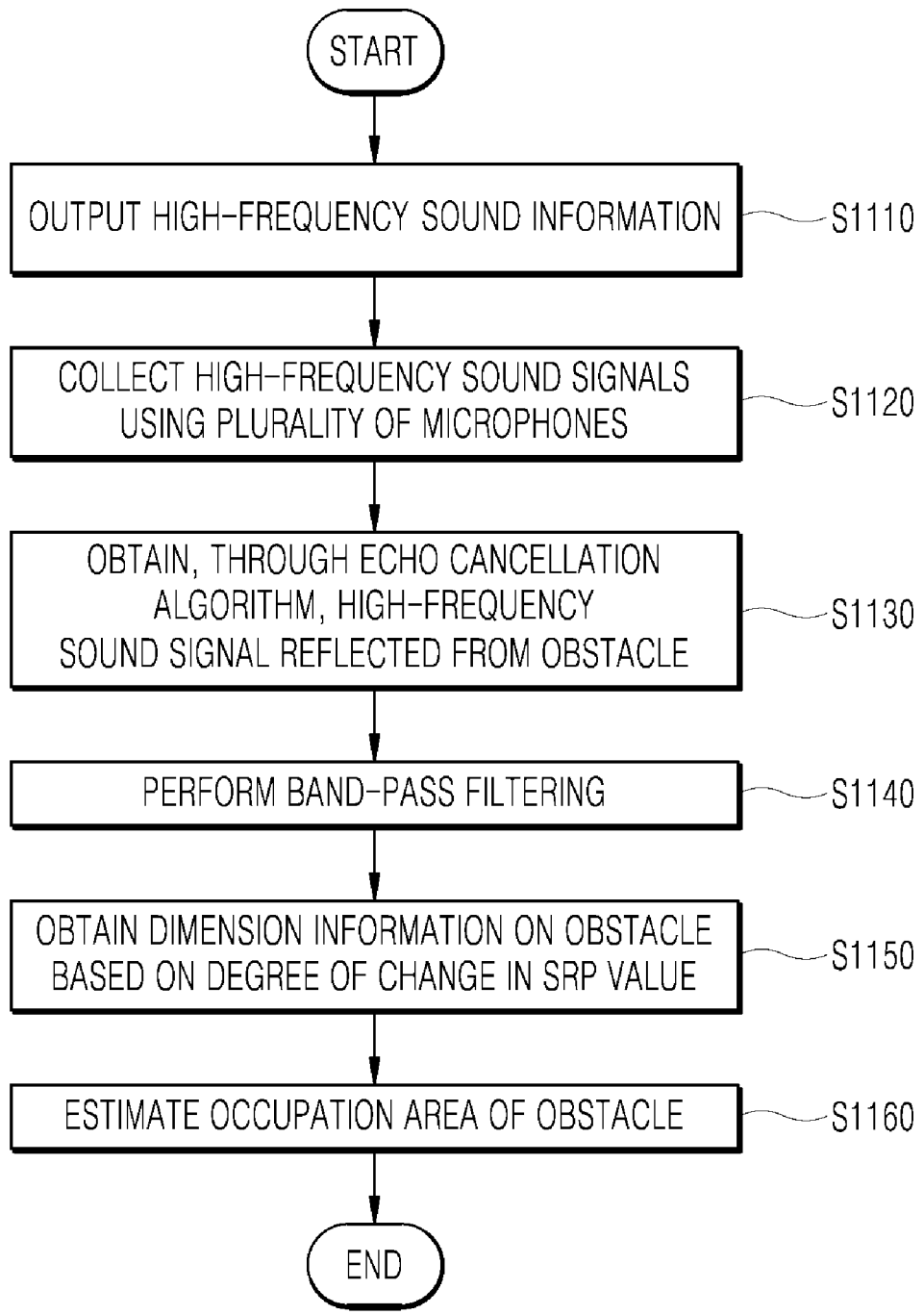

FIGS. 9 to 11 are diagrams illustrating embodiments of finding the obstacle S720 and estimating the occupation area S730 of FIG. 7.

Referring to FIG. 9, the robot 100 may find the obstacle using the camera 121, and estimate the occupation area of the obstacle.

Specifically, the robot 100 may capture images of its surroundings using the vision recognition-based camera 121 while rotating S910.

The robot 100 may recognize the obstacle based on captured image information S920. Specifically, the robot 100 may recognize the obstacle based on a first deep neural network model, wherein the first deep neural network model may receive the captured image information as input data, recognize the obstacle based on the captured image information, and output recognized obstacle information as output data.

The robot 100 may recognize the obstacle S920, and estimate the occupation area of the obstacle in the space S930.

Specifically, the robot 100 may obtain dimension information on the obstacle in the space where the robot 100 is located, based on the captured image information, and estimate the occupancy area of the obstacle in the space based on the obtained dimension information.

Referring to FIG. 10, the robot 100 may find the obstacle using the proximity sensor 133, and estimate the occupation area of the obstacle.

First, the robot 100 may detect its surroundings through the proximity sensor 133 while rotating S1010.

The robot 100 may remove noise S1020.

The robot 100 may find the obstacle S1030, and estimate the occupation area of the obstacle in the space S1040.

Referring to FIG. 11, the robot 100 may output high-frequency sound information through the speaker 143 S1110.

The robot 100 may collect high-frequency sound signals using the plurality of microphones 123 S1120.

The robot 100 may apply an echo cancellation algorithm to obtain a high-frequency sound signal reflected from the obstacle S1130, and may perform filtering (band-pass filtering) to isolate the high-frequency sound signal in the obtained sound signal S1140.

The robot 100 may obtain dimension information on the obstacle based on the degree of change in the SRP value S1150, and estimate the occupation area of the obstacle S1160.

Figure 12:
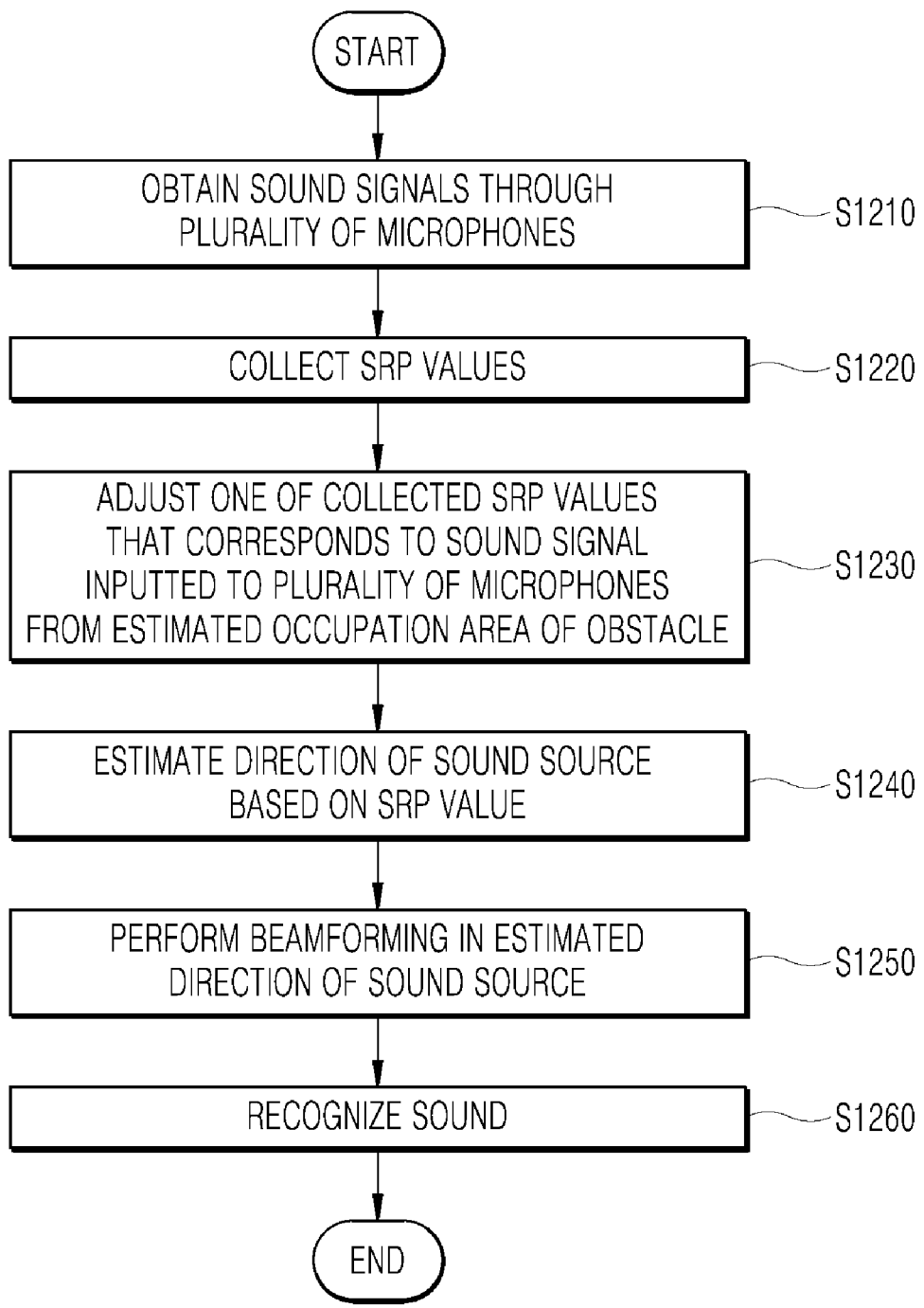

FIG. 12 is a sequence diagram illustrating a method for operation of the robot 100 to recognize a sound from the sound source, according to one embodiment of the present disclosure.

Referring to FIG. 12, the robot 100 may obtain sound signals through the plurality of microphones 123 S1210.

The robot 100 may collect SRP values S1220, and may adjust one of the collected SRP values that corresponds to a sound signal received at the plurality of microphones 123 from the estimated occupation area of the obstacle S1230.

That is, the robot 100 may reduce the influence of the sound signal that is reflected from the obstacle and then received at the plurality of microphones 123. The robot 100 may lower the SRP value corresponding to the received sound signal, or adjust the SRP value to zero.

As a result, the robot 100 may estimate a direction of the sound source based on the SRP value S1240.

The estimated direction refers to a direction of the area where the obstacle is not present, and the direction having the highest SRP value may be set as the direction of the sound source.

The robot 100 may perform beamforming in the estimated direction of the sound source S1250, and may recognize the sound S1260.

The beamforming may amplify a specific-frequency sound signal by adjusting a gain of one or more of the plurality of microphones 123, and as a result, the sound signals received from the sound source may be more clearly detected. The beamforming may reduce, for example, ringing sounds (reverberation) and interference sounds (noise) due to the characteristics of the space, and as a result, the robot 100 may process the sound signals to be more approximate to the original sound.

When the sound information from the sound source is speech information, the robot 100 may amplify the sound signals from the sound source by performing beamforming in the direction of the sound source, and as a result, may more accurately recognize the speech information.

In estimating the direction of the sound source S1240, the robot 100 may estimate the direction information on the sound source based on a second deep neural network model, wherein the second deep neural network model may receive, as input data, the sound information outputted from the sound source and input direction information on the sound signals received at the robot 100 through the plurality of microphones 123, and output, as output data, the direction information on the sound source around the robot 100.

In particular, the robot 100 may exclude, from the input data, the sound signal received at the plurality of microphones 123 from the occupation area of the obstacle. In this case, the robot 100 may reduce a deviation between the result of estimating the direction information on the sound source through actual measurement using SRP values and the result of estimating the direction information on the sound source by using a deep learning algorithm. As a result, it is possible to improve the accuracy of estimating the direction information on the sound source using AI.

Figure 13:
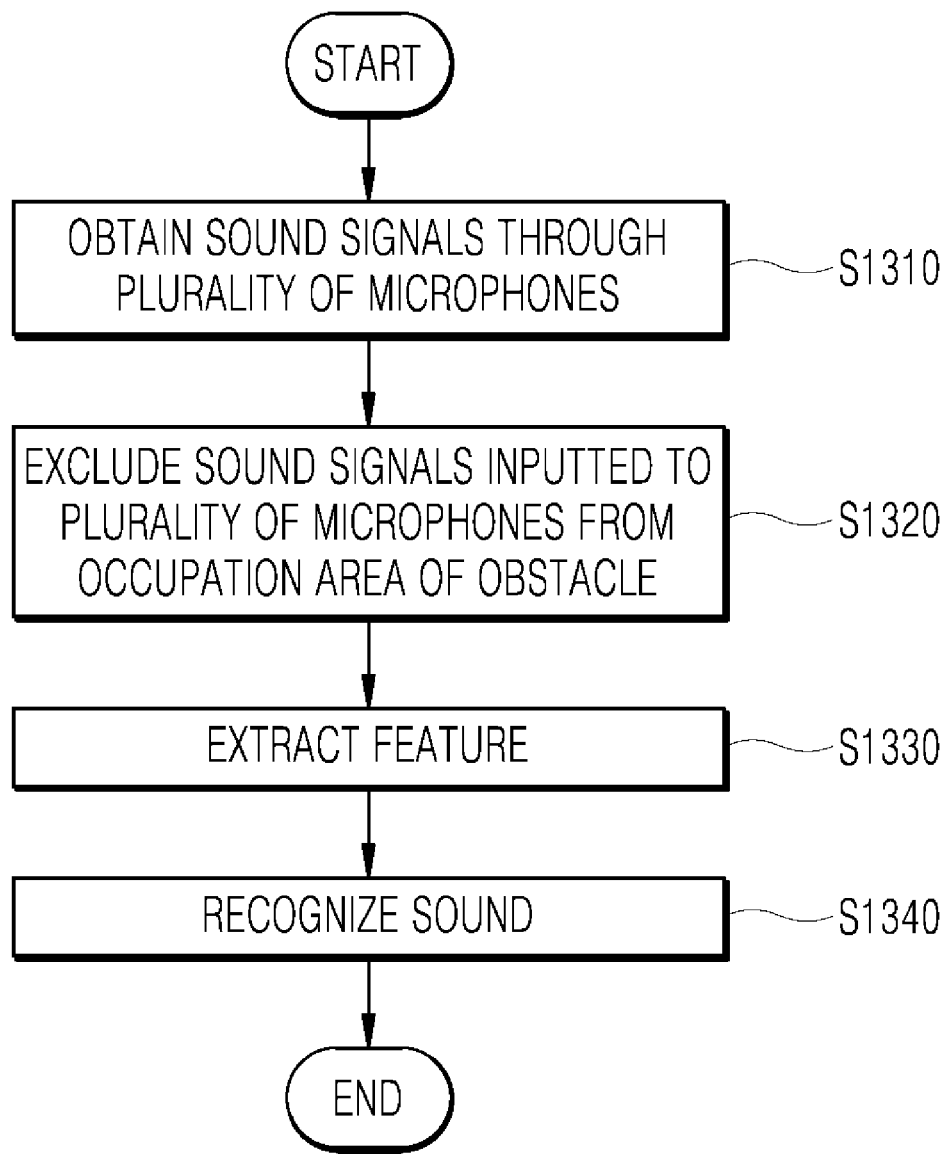

FIG. 13 is a sequence diagram illustrating a method for operation of the robot 100, according to one embodiment of the present disclosure.

Referring to FIG. 13, the robot 100 may obtain the sound signals through the plurality of microphones 123 S1310. However, the robot 100 may exclude sound signals received at the plurality of microphones 123 from the occupation area of the obstacle S1320.

When the statistical characteristics of features used in both training and testing for supervised learning-based classification are as similar as possible, the classification result may be improved. This may be more effective in recognizing sound as a result of removing the sound signal received at the plurality of microphones 123 from the obstacle which was not present during training.

In addition, the deviation between the result of estimating the direction information on the sound source through measurement and the result of estimating the direction information through deep learning operation may be reduced. In actual deep learning operations, not taking into consideration the input of the sound signal reflected from the obstacle may be effective in extracting the feature of the deep learning algorithm.

The robot 100 may extract the feature 51330, and complete the deep neural network model. The deep neural network model may be applied with various deep learning algorithms.

The robot 100 may recognize the sound based on the completed deep neural network model S1340.

The robot 100 may compare the direction information on the sound source based on the actual measurement using the SRP values and the direction information on the sound source based on the deep neural network model to which the deep learning algorithm is applied. As a result, it is possible to increase the accuracy of the deep neural network model and to prevent interference of the sound signal distorted by the obstacle. That is, the direction information on the sound source based on the actual measurement may serve as a label for training data.

The present disclosure described above may be implemented as a computer-readable code in a medium on which a program is recorded. The computer-readable medium may include all kinds of recording devices in which computer-readable data is stored. The computer-readable medium may be, for example, a hard disk drive (HDD), a solid-state disk (SSD), a silicon disk drive (SDD), read-only memory (ROM), random access memory (RAM), CD-ROM, a magnetic tape, a floppy disk, or an optical data storage device. In addition, the computer may include the processor 190 of the robot 100.

The specific embodiments of the present disclosure in the foregoing have been described for illustrative purposes, and as such the scope or spirit of the present disclosure is not limited thereto, and it will be understood by those skilled in the art that various changes and modifications can be made to other specific embodiments without departing from the spirit and scope of the present disclosure. Therefore, the scope of the present disclosure should be defined not by the above-described embodiments but by the technical idea defined in the following claims.

What is claimed is:

1. A method for controlling a robot, the method comprising:
    detecting a movement of the robot to a location;
    detecting an obstacle within a predetermined range from the robot;
    estimating an occupation area of the obstacle in space; and
    identifying a sound signal received from the estimated occupation area of the obstacle from among a plurality of sound signals received by a plurality of microphones of the robot at the location; and
    estimating an estimated direction of a sound source based on a deep neural network model, wherein the deep neural network model is configured to receive, as input data, the plurality of sound signals and input direction information on the sound signals received by the plurality of microphones excluding the sound signal from the estimated occupation area of the obstacle, and output, as output data, the estimated direction of the sound source,
    wherein the deep neural network model is trained based on labeled training data obtained by comparing estimated direction output data of the deep neural network with measured estimated direction information determined by the robot,
    wherein the measured estimated direction information is determined by determining steered response power (SRP) values at each of a plurality of angles around the robot and lowering, within a predetermined range, an SRP value among the determined SRP values that corresponds to the sound signal of the plurality of sound signals from the estimated occupation area of the obstacle.

2. The method according to claim 1, wherein the movement of the robot is detected based on sensing information collected from an inertial measurement sensor (IMS).

3. The method according to claim 1, wherein detecting the obstacle comprises:
    capturing one or more images of surroundings of the robot while rotating about a gravity axis of the robot; and
    recognizing the obstacle based on captured one or more images.

4. The method according to claim 3, wherein the obstacle is recognized based on another deep neural network model, wherein the another deep neural network model is configured to receive the captured one or more images as input data and output recognized obstacle information as output data.

5. The method according to claim 1, wherein the occupation area of the obstacle is estimated based on dimension information of the obstacle obtained based on the captured one or more images.

6. The method according to claim 1, wherein the obstacle is detected using a proximity sensor while rotating the robot about a gravity axis of the robot.

7. The method according to claim 1, wherein estimating the occupation area of the obstacle comprises:
    outputting high-frequency sound information;
    receiving high-frequency sound signals through the plurality of microphones;
    identifying, from among the received high-frequency sound signals using an echo cancellation algorithm, a high-frequency sound signal that was reflected from the obstacle; and
    obtaining dimension information of the obstacle based on a degree of change in steered response power (SRP) value determined at each of a plurality of angles around the robot,
    wherein the occupation area of the obstacle is estimated based on the dimension information.

8. The method according to claim 1, further comprising:
    amplifying the sound signal from the sound source by performing beamforming in the direction of the sound source when the sound signal is speech; and
    performing speech recognition based on the amplified sound signal.

9. A robot, comprising:
a camera configured to capture images of surroundings of the robot;
a sensor configured to detect movement of the robot;
a plurality of microphones; and
a controller configured to:
detect a movement of the robot to a location via the sensor;
detect an obstacle within a predetermined range from the robot based on one or more images captured by the camera;
estimate an occupation area of the obstacle in space;
identify a sound signal received from the estimated occupation area of the obstacle from among a plurality of sound signals received by the plurality of microphones at the location; and
estimate an estimated direction of a sound source based on a deep neural network model, wherein the deep neural network model is configured to receive, as input data, the plurality of sound signals and input direction information on the sound signals received by the plurality of microphones excluding the sound signal from the estimated occupation area of the obstacle, and output, as output data, the estimated direction of the sound source,
wherein the deep neural network model is trained based on labeled training data obtained by comparing estimated direction output data of the deep neural network with measured estimated direction information determined by the robot,
wherein the measured estimated direction information is determined by determining steered response power (SRP) values at each of a plurality of angles around the robot and lowering, within a predetermined range, an SRP value among the determined SRP values that corresponds to the sound signal of the plurality of sound signals from the estimated occupation area of the obstacle.

10. The robot according to claim 9, further comprising a rotation driver configured to rotate the robot about a gravity axis of the robot,
wherein the controller is further configured to:
control the rotation driver to rotate the robot while the camera captures the one or more images; and
recognize the obstacle based on the captured images.

11. The robot according to claim 10, wherein the plurality of microphones are uniformly arranged on the robot to be spaced apart by a predetermined distance from one another, and wherein two of the plurality of microphones are arranged toward a front of the robot and another two of the plurality of microphones are arranged toward a rear of the robot.

12. The robot according to claim 10, wherein the obstacle is recognized based on another another deep neural network model, wherein the another another deep neural network model is configured to receive the captured one or more images as input data and output recognized obstacle information as output data.

13. The robot according to claim 9, wherein the occupation area of the obstacle is estimated based on dimension information of the obstacle obtained based on the captured one or more images.

14. The robot according to claim 9, further comprising a speaker configured to output high-frequency sound information,
wherein the controller is further configured to:
output high-frequency sound information via the speaker;
identify, from among high-frequency sound signals using an echo cancellation algorithm, a high-frequency sound signal that was reflected from the obstacle; and
obtain dimension information of the obstacle based on a degree of change in steered response power (SRP) value determined at each of a plurality of angles around the robot,
wherein the occupation area of the obstacle is estimated based on the obtained dimension information.

15. The robot according to claim 9, wherein the controller is further configured to:
amplify the sound signal from the sound source by performing beamforming in the direction of the sound source when the sound signal is speech; and
performing speech recognition based on the amplified sound signal.

* * * * *